United States Patent [19]
Bruno et al.

[11] Patent Number: 5,724,407
[45] Date of Patent: Mar. 3, 1998

[54] NETWORK BASED MULTIMEDIA MESSAGING METHOD FOR NON-CCITT COMPLIANT SWITCHES

[75] Inventors: Richard F. Bruno, Morristown; Robert E. Markowitz, Glen Rock, both of N.J.; Carlos A. Perea, Bethlehem, Pa.; Peter H. Stuntebeck, Little Silver; Roy P. Weber, Bridgewater, both of N.J.

[73] Assignee: AT&T Corp., Middletown, N.J.

[21] Appl. No.: 615,350

[22] Filed: Mar. 13, 1996

Related U.S. Application Data

[63] Continuation-in-part of Ser. No. 357,473, Dec. 16, 1994, abandoned.

[51] Int. Cl.$^6$ ............................................. H04M 1/64
[52] U.S. Cl. ..................... 379/67; 379/88; 379/90.01; 379/93.01; 348/14
[58] Field of Search ........................ 379/67, 69, 70, 379/74, 77, 88, 89, 90.01, 93.01, 93.05, 93.14, 93.15, 100.08, 120, 127, 142, 201, 207, 213, 214, 243, 244, 245, 53; 348/6, 7, 8, 13, 14; 358/402, 403; 399/200

[56] References Cited

U.S. PATENT DOCUMENTS

| | | | |
|---|---|---|---|
| 4,837,798 | 6/1989 | Cohen et al. | 379/88 |
| 5,008,926 | 4/1991 | Misholi | 379/89 |
| 5,192,999 | 3/1993 | Grazyck et al. | 358/85 |
| 5,193,110 | 3/1993 | Jones et al. | 379/94 |
| 5,200,993 | 4/1993 | Wheeler et al. | 379/96 |
| 5,265,205 | 11/1993 | Schroder | 395/200 |

(List continued on next page.)

FOREIGN PATENT DOCUMENTS

| | | | |
|---|---|---|---|
| 63-127645 | 5/1988 | Japan | 379/53 |
| 1-132261 | 5/1989 | Japan | 379/53 |
| 3-140052 | 6/1991 | Japan | 379/53 |
| 4-109742 | 4/1992 | Japan | 379/53 |

OTHER PUBLICATIONS

"Network Capabioities in Support of Multimedia Applicaitons", G.D. Flinchbaugh et al., IEEE, pp. 308.7.1 to 308.7.5, Dec. 1990.

"VISTUM: AT&T's Board–Level Videoconferencing at the Desktop", Andrew W. Davis, Advanced Imaging, p. 46, Sep. 1994.

"Metting on the Edge", Don Labriola, Windows Sources, p. 96, Sep. 1994.

"Desktop Videoconferencing and Imaging: Is There Really an H.320 vs. Indeo Conferencing Compression War?", Andrew W. Davis, Advanced Imaging, p. 36, Sep. 1994.

"Multimedia Mail", Ned Freed, LAN Magazine, vol. 9, No. 5, p. 29, May 1994.

*Primary Examiner*—Krista Zele
*Assistant Examiner*—Scott L. Weaver
*Attorney, Agent, or Firm*—Thomas A. Restaino

[57] ABSTRACT

A method is disclosed for messaging multimedia calls with a non-CCITT compliant switch when the intended recipient is unavailable. The method is used in connection with a telecommunication network which has an identified multimedia server. According to the method, multimedia calls from a caller, using a multimedia device running a first application and a second application, are messaged when the called party is unavailable. The method involves initiating a multimedia call to the called party using the first application and determining that the multimedia call is an unanswered call using the second application. Using the second application, the first application is signalled to indicate that the multimedia call was unanswered. In response to the signal, an X.25 packet message is sent from the multimedia device to the identified network based multimedia server. The multimedia device receives back a messaging address identifying a multimedia messaging server from the network based multimedia server. A second multimedia call is initiated from the multimedia device to the identified multimedia messaging server using the first application and the messaging address. The method then involves connecting to the multimedia messaging server indicated by the messaging address and recording a multimedia message on the network based multimedia messaging server.

10 Claims, 5 Drawing Sheets

U.S. PATENT DOCUMENTS

| | | | |
|---|---|---|---|
| 5,333,266 | 7/1994 | Boaz et al. | 395/200 |
| 5,335,276 | 8/1994 | Thompson et al. | 380/21 |
| 5,345,258 | 9/1994 | Matsubara et al. | 348/14 |
| 5,349,636 | 9/1994 | Irribarren et al. | 379/89 |
| 5,351,276 | 9/1994 | Doll, Jr. et al. | 379/67 |
| 5,369,686 | 11/1994 | Dutra et al. | 379/94 |
| 5,384,835 | 1/1995 | Wheeler et al. | 379/96 |
| 5,394,445 | 2/1995 | Ball et al. | 379/67 |
| 5,406,557 | 4/1995 | Baudoin | 379/94 X |
| 5,452,289 | 9/1995 | Sharma et al. | 370/32.1 |
| 5,453,486 | 9/1995 | Davis et al. | 379/202 X |
| 5,467,390 | 11/1995 | Brankley et al. | 379/229 |
| 5,497,373 | 3/1996 | Hulen et al. | 379/399 X |
| 5,502,727 | 3/1996 | Catanzaro et al. | 348/14 X |
| 5,524,137 | 6/1996 | Rhee | 379/67 |
| 5,530,740 | 6/1996 | Irribarren et al. | 379/89 |
| 5,559,721 | 9/1996 | Ishii | 358/402 X |
| 5,559,868 | 9/1996 | Blonder | 379/96 |
| 5,630,060 | 5/1997 | Tang et al. | 395/200.01 |

NETWORK BASED MULTIMEDIA MESSAGING METHOD FOR NON-CCITT COMPLIANT SWITCHES

CROSS REFERENCE TO RELATED APPLICATIONS

This application is a continuation-in-part of U.S. patent application Ser. No. 08/357,473 filed Dec. 16, 1994, now abandoned, and related to U.S. patent application Ser. No. 08/525,440 filed Sep. 7, 1995.

FIELD OF THE INVENTION

This invention relates to a method for Network Based Multimedia Messaging and, more particularly, to a method for handling multimedia messages with non-CCITT compliant switches when the intended recipient of the multimedia message is unavailable.

BACKGROUND OF THE INVENTION

Multimedia communication is the wave of the future. The power of multimedia communication is evident from the expansion in "videoconferencing", in which a user at a videoconferencing station may have a "face-to-face" communication in real time with someone at another videoconferencing station, although they may be separated by vast distances. The introduction of desktop videoconferencing equipment is making multimedia communication even more prevalent. Generally, multimedia communication uses equipment incorporated as part of a general purpose computer, such as multimedia capable board sets designed for used in personal computers or integrated systems specifically designed for the task. A more detailed general background on multimedia communication, and particularly, desktop videoconferencing and equipment may be found in Don Labriola, *Meeting on the Edge*, Windows Sources, September 1994, at 96. A representative example of initiating and completing multimedia call is shown and described in U.S. Pat. No. 5,371,534 incorporated herein by reference.

While real-time communications are made possible with these technologies, certain problems still exist. A person using a multimedia communication device or station calling another remote multimedia communication station almost exclusively encounters one of two scenarios. Either a) the call is answered, in which case the communication may proceed, or b) the call goes unanswered. While the call may go unanswered because: the called party may have their multimedia communication station turned off thereby being unable to answer the call, the called party may be busy communicating with another party, i.e. a different call, the called party may be away from the equipment or out of town and therefore, not physically able to answer the call, or 3) the person may not wish to answer the call and just lets the phone ring, the problem is the same, namely the caller cannot complete the call.

Of course a possible solution to the problem is that the caller can hang up, and place a new call at a later time, but this may be inconvenient and, in any event, there is no guarantee that the caller will not face the same problem at that time. Another alternative is that the caller could call the party's voice messaging system. However, doing so requires an extra step and the video and data aspects are lost.

Although some electronic mail (e-mail) systems allow the sender to attach a brief video clip to an electronic mail message, this alternative is still a problem because it requires compatible video equipment and e-mail programs/software.

It is well known that digitized video information takes up a considerable amount of data storage space in a storage device, for example, a computer memory. Accordingly, large local message storage capability is required at the sending end, where the message is created, and at the receiving end where the message will be replayed. If there is insufficient storage space at the receiving end the recipient may only be able to access a portion of the message or possibly not access the message at all. Additionally, using the e-mail alternative is disadvantageously time consuming and cumbersome because the caller must create the video clip, create an e-mail message, attach the video clip to the e-mail message and then send the message.

Thus, there remains a need in the art of multimedia communication for a solution to the problem created by the caller whose multimedia call goes unanswered by the intended recipient of the message.

SUMMARY OF THE INVENTION

In accord with the invention, we have realized a method of handling multimedia calls from a caller, using a multimedia device which is running a first application and a second application, to a party who is unavailable. The method involves initiating a multimedia call to the party using the first application and determining that said first multimedia call is an unanswered call using the second application. The method then involves signalling the first application that the call is unanswered using the second application. In response to the signal, the method sends an X.25 packet message from the multimedia device to a previously identified network based multimedia server. The application receives from the network based multimedia server, at the multimedia device, a messaging address indicating a multimedia messaging server. The method further involves initiating a second multimedia call to the indicated multimedia messaging server and connecting to the multimedia messaging server indicated by the messaging address. The method further involves recording a multimedia message for the party on the network based multimedia messaging server.

Other features will become apparent from the following detailed description considered in conjunction with the accompanying drawings. It is to be understood, however, that the drawings are intended solely for purposes of illustration and not as a definition of the limits of the invention, for which reference should be made to the appended claims.

BRIEF DESCRIPTION OF THE DRAWINGS

In the drawings, wherein like reference designations denote like objects.

DETAILED DESCRIPTION OF THE INVENTION

Figure 1:
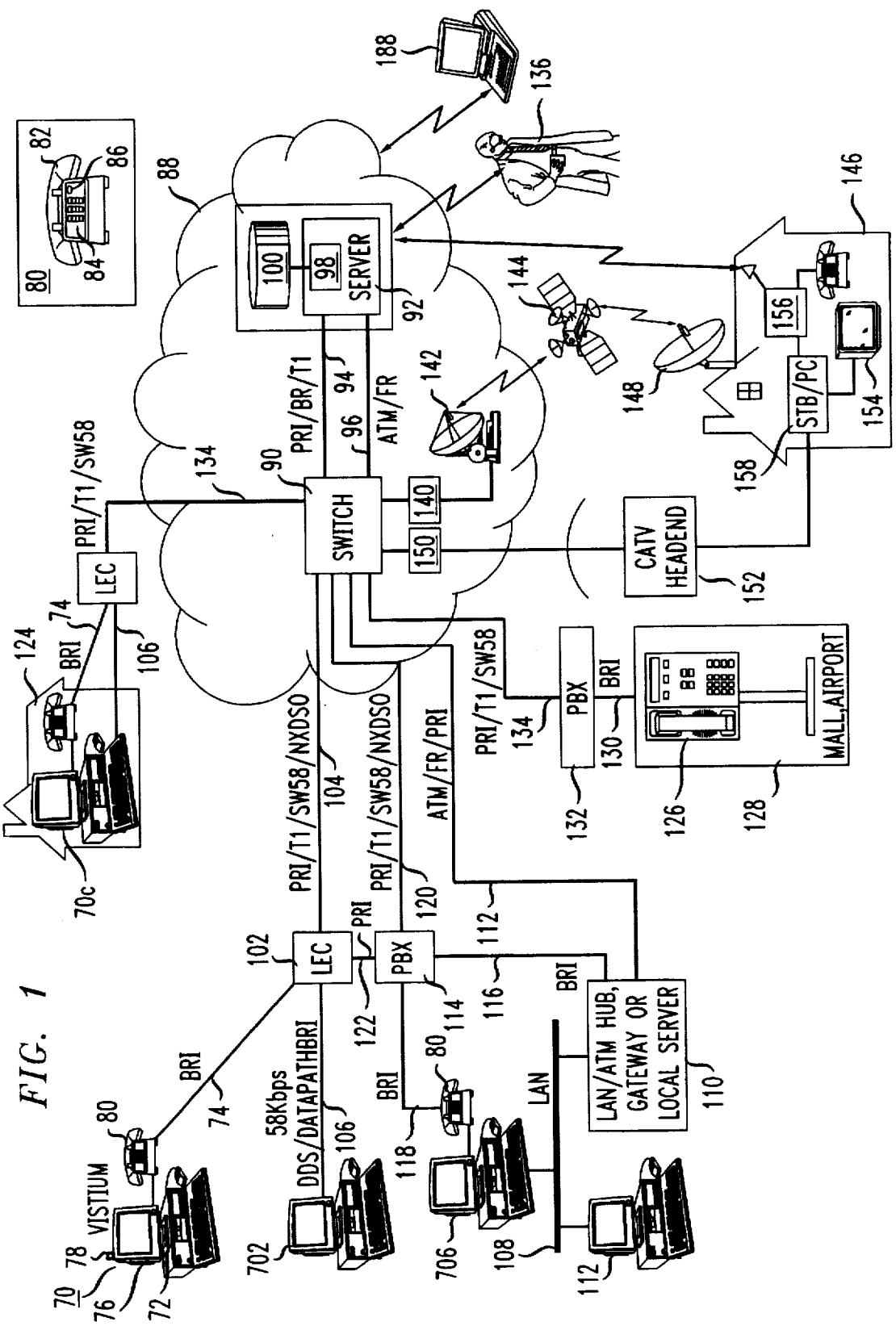
FIG. 1 shows a simplified telecommunication network in accord with an embodiment of the present invention.

FIG. 1 shows a simplified telecommunication network in accord with an embodiment of the present invention. It will be recognized that the network of FIG. 1 includes other known elements, but those elements have been omitted for simplicity in that they are not required for an understanding of the invention disclosed herein.

A caller, using a multimedia communication device or station which is preferably H.320 protocol compliant, will furnish a multimedia message to a recipient with a multimedia communication device or station, which is also preferably H.320 protocol compliant, by placing a call to the recipient. The multimedia message includes, for example, the myriad of combinations of voice, video, datafiles, graphics, whiteboards and shared applications. The caller is equipped with a multimedia device or station 70 which, for example, includes a processing unit 72 coupled to a communication line 74, a CRT or computer viewing screen 76 upon which a multimedia message may be viewed and a camera 78. The multimedia station 70 may additionally include an associated telephone 80 located external to the processing unit 72 to facilitate dialing when the processing unit 72 is incapable of doing so directly. As will be explained below in greater detail, where an external telephone 80 is used, in addition to the usual handset 82 and dialing pad 84, the telephone 80 may also include a message indicator 86 which is used to alert a person at that phone that a message has been received and is pending. The processing unit 72 may be a general purpose computer with multimedia capable equipment incorporated therein or a multimedia specific device or station. In a preferred embodiment, the multimedia communication device is a personal computer which is multimedia capable as part of its design or which has an additional board set which allows it to perform video and ISDN communications and is H.320 compliant. One example of a known board set is the Vistium video system board set although others of similar capability are equally suitable. The construction and operation of the Vistium video system is extensively described in Andrew W. Davis, *VISTIUM: AT&T's Board-Level Videoconferencing at the Desktop*, Advanced Imaging, September 1994 at 46 which is incorporated herein by reference.

The multimedia device will be connected to the telecommunication network 88 by a communication path which connects a multimedia station and the telecommunication network. The communication path may be comprised of sub-paths which are themselves capable of supporting the transfer of multimedia messages. For example, the communication path between the network and a multimedia station may be from the multimedia station 70 over an ISDN BRI path 74 (sometimes referred to as BRI) to a Local Exchange Carrier (LEC) 102 and then over an ISDN PRI (sometimes referred to as PRI), T1.5 (sometimes referred to as T1) or switched 56 (sometimes referred to as SW56) path 104 between the LEC 102 and the network 88. Alternatively, the path between a multimedia station 70a and the LEC 102 may include a 56 Kbps DDS/Datapath 106.

In another embodiment, a multimedia device 70b may be part of a local area network (LAN) 108 which also includes a LAN server 110 as well as other multimedia devices and non-multimedia computers 112, only one of which is shown. Where the multimedia device 70b is part of a LAN 108, the communication path may advantageously include a path which directly connects the network based server 92 to a LAN/ATM Hub, gateway or local server 110 over, for example, an ATM or frame relay (FR) path 112 or to a PBX 114 over a BRI path 116. Conveniently, the direct connection communication path from the network to the LAN/ATM Hub, gateway or local server 110 allows additional versatility by, for example, providing an alternative connection for the LAN server 110 thereby allowing the network based server 92 to leave an "alert" pending on the LAN server 110 so that as soon as the user signs on to the LAN, they are alerted to the pending message.

In still another embodiment, the connection may be by a BRI path 118 to a PBX 114 and by a PRI, T1, SW56 or nxDS-0 path 120 between the PBX 114 and the telecommunication network 88.

In yet another embodiment, the PBX 114 may be connected over a PRI path 122 to a LEC 102 which is connected to the network 88 by a PRI, T1 or SW56 path 104.

The invention has the further convenient advantage that it is not confined to a multimedia device located in a home or office 124. A pay multimedia device 126 may be constructed and located in a publicly accessible area, for example, near pay telephones at a mall, airport or hotel 128. As shown, the pay multimedia device 126 is connected by a BRI path 130 to a PBX 132 which is in turn connected to the network 88 by a PRI, T1 or SW56 path 134. In a related manner, a transportable wireless device 136, for example, a laptop computer 138, pager or cellular telephone, may be carried by a party and employed to receive an alert, from the network based server 92, for a recorded multimedia message. Additionally, the wireless device 136 may be further equipped to receive an audio portion of the message or the entire multimedia message when, for example, a multimedia capable laptop computer or other multimedia capable reception device is used.

The telecommunication network 88 includes a switch 90 to which the illustrated multimedia stations 70, 70a, 70b, 70c can be coupled and a network based multimedia capable server 92. The switch 90 is coupled by, for example, a PRI, BRI, T1 path 94 or an ATM or FR path 96 to the network based multimedia server 92. The multimedia server 92 includes a processor 98, for example a microprocessor. The multimedia server 92 is coupled to a storage device or memory 100, for example, a hard disk or other electronic, electromagnetic or optical rewriteable storage device, which is used for storing a multimedia message. In an ISDN system using Px64 data compression (128 Kbits/sec) an hour long multimedia message (video/audio/data) occupies approximately 60 Megabytes of storage space. Accordingly, the memory 100 associated with the server 92 should be sized according to the particular data compression method used. Furthermore, while the server and memory is shown and described as a unitary device, the "server" may actually be a plurality of co- or sub-servers which access a unitary remote memory or a plurality of memories associated with groups of servers or each individual server. The processor 98 is configured to accept incoming multimedia data representing the multimedia message or multimedia greeting message and store it in the memory 100. The processor 98 is also configured to retrieve the stored multimedia data from the memory 100 and furnish it at a later time. The switch 90 is preferably constructed to comply with CCITT recommendations L250 et seq. and, more particularly, as set forth in *CCITT Integrated Services Digital Network (ISDN) General Structure and Service Capabilities*, Call Forwarding Busy, Recommendation I.252.2 (1992) and *Integrated Services Digital Network (ISDN) General Structure and Service Capabilities*, Call Forwarding No Reply, Recommendation I.252.3 (1992), both published by the ITU and incorporated herein by reference, or a network equipment arrangement providing the functionality of forwarding an unanswered call to an alternate number. The implementation of recommendations I.252.2 and I.252.3 allows the generation of a signal by the ISDN telecommunications network switch which indicates that the call is an unanswered call. The switch will thereafter, in response to the signal, connect the call to another telephone number which, as used herein, corresponds to the telephone number of the network based multimedia server 92. The switch 90 is, in suitable embodiments, of the No. 5ESS™ (electronic switching system) design of the "generic 6" or higher level of implementation which incorporates CCITT recommendations I.252.2 (Call Forwarding Busy (CFB)) and I.252.3 (Call Forwarding No Reply (CFNR)). The general architecture of the No. 5ESS™ design is described in the series of articles published in the AT&T Technical Journal, Volume 64, No. 6, part 2, pp. 1305–1564, July/August, 1985 which is incorporated herein by reference.

In an alternative embodiment, the switch 90 is either constructed without implementing CCITT recommendations I.252.2 and I.252.3 or the functions defined by CCITT recommendations I.252.2 and I.252.3 are implemented but they do not function for certain calls (herein defined and referred to as a "non-CCITT compliant" switch).

In another embodiment, the telecommunication network 88 may include additional processing equipment 140 following the switch 90 which will configure an outgoing multimedia message for a message path which includes a satellite transmitter 142 so that the server 92 can furnish the multimedia message via satellite 144 to a home 146 equipped with a satellite receiver 148. In still another embodiment, the telecommunication network 88 may include processing equipment 150 to configure an outgoing multimedia message for a path which includes a cable television headend 152 for ultimate provision to a home 146 where the message can be viewed on a television set 154. In a still further embodiment, the path may include a switched voice/digital (SVD) or other wired or wireless multimedia capable modem 156. Where cable 152, satellite 148 or a modem 156 is used, additional processing equipment 158, for example, a cable converter, satellite transmission converter or personal computer may be necessary to access a message or further process a message before it can be viewed.

Regarding the paths described herein, it will be recognized that types or combinations of paths other than those described herein will work provided the path is capable of supporting a combination of single or two channel video, audio or data. By way of example, where the path is an ISDN path it should support about 64 kilobits per second access for combinations of single channel video, audio and data or about 128 kilobits per second access for combinations of two channel video, audio and data. Where the path is switched 56 it should support about 56 kilobits per second access for combinations of single channel video, audio and data or about 112 kilobits per second access for combinations of two channel video, audio and dam. Where the path is nxDS-0, the path should support n×64 kilobits per second access, where n is the number of channels.

It will be further recognized that video compression technology, communication protocols and existing bandwidth limitations set the limits for the types of paths which may be used. It is therefore contemplated that advances in, for example, video compression technology may alter, supplement or supplant the particular path implementations of the above without departing from the invention. A discussion illustrating emerging video compression methods and technology may be found in Andrew W. Davis, *Desktop Videoconferencing and Imaging: Is There Really an H.320 vs. Indeo Conferencing Compression War?*, Advanced Imaging, September 1994, at 36.

Figure 2:
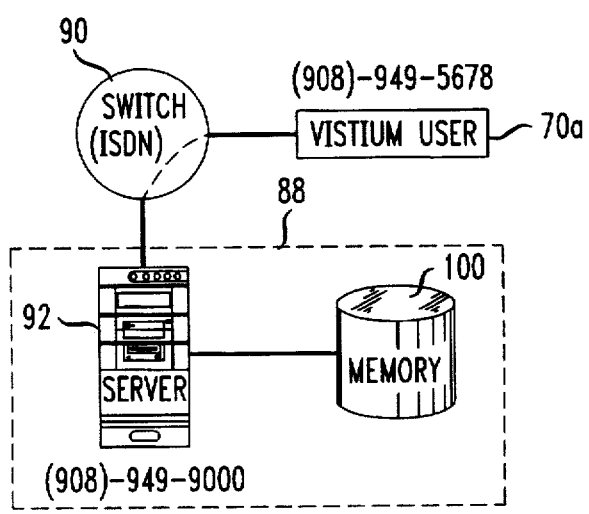
FIG. 2 shows the process of leaving a multimedia greeting message using a simplified portion of the telecommunication network of FIG. 1.

Referring now to FIG. 2 which shows, by way of illustrative example, the preferred process of leaving a multimedia greeting message using a simplified portion of the telecommunication network of FIG. 1 over ISDN paths. A party at a multimedia device or station 70a, illustrated herein as a multimedia capable system or personal computer containing a multimedia capable board set, who is identifiable by the associated telephone number 908-949-5678, wishes to leave a multimedia greeting message for callers, because the party will be away for the next three weeks. The party directly calls the network based multimedia server 92 which is shown as identifiable by the associated telephone number 908-949-9000. A switch 90, located in the telecommunication network 88 of FIG. 1, connects the call to the network based multimedia server 92 which answers the call. In the preferred embodiment, upon answering the call, the server 92 checks the information in the calling line identification (CLI), which is available from the network, to determine whether the caller called the server directly (the "originally called number" in the CLI is the server telephone number) or called another telephone number and was connected to the server by the switch (the "originally called number" in the CLI is the called telephone number).

Based upon the CLI, the server 92 presents the party with a plurality of options, for example, record a greeting message, record a message, play messages, delete messages, retrieve messages. In the preferred embodiment however, before the options are presented, the server 92 requests that the party supply some personal identification information for security/fraud prevention, for example, their multimedia station identification or home telephone number (thus allowing remote access), a PIN number or voiceprint. Upon receipt of a proper identification, the party will be presented with the plurality of options.

The party may then create a multimedia greeting message using their multimedia device. The recorded greeting message will thereafter be furnished to the caller by the server when a call to the party is unanswered unless the greeting is subsequently deleted or changed by the party. The multimedia greeting message is associated with the party's telephone number and stored in a memory 100 associated with the server 92 when the party hangs up.

Figure 3:
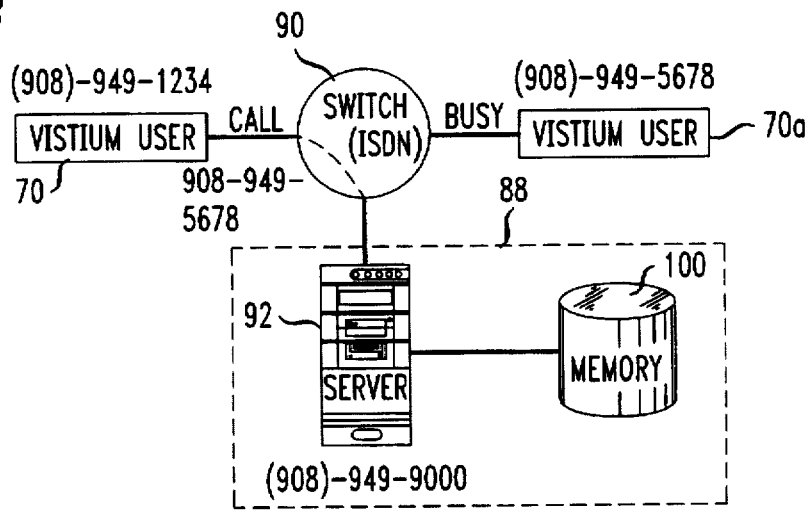
FIG. 3 shows the process of leaving a multimedia message using a simplified portion of the telecommunication network of FIG. 1.

Referring now to FIG. 3 which shows by way of illustration the process of leaving a multimedia message using a simplified portion of the telecommunication network of FIG. 1. As with FIG. 2, the paths are ISDN.

A caller with a multimedia station 70, associated with the telephone number 908-949-1234, calls a recipient in order to furnish a multimedia message to that recipient (in this example, the intended recipient is the party from FIG. 2). The caller dials the number "908-949-5678" but the line is busy because the party is on a multimedia conference call. By virtue of the implementation of CCITT recommendation I.252.2, the switch 90 determines that the call is unanswered and connects the call to the network based multimedia server 92 of FIG. 2. The server 92 answers the call, checks the CLI and based upon the called number recognizes the call as "leaving a message." The server 92 furnishes the caller with a visual or multimedia greeting message which may be a system supplied message, where no prerecorded multimedia greeting message exists for the dialed number, or as with FIG. 2, plays the multimedia greeting message left by the party. After providing the greeting message to the caller, the server 92 begins recording the caller's multimedia message. The server associates and stores the message and "for" 908-949-5678 "from" 908-949-1234 in the memory 100 or alternatively the server 92 associates and stores the CLI with the message. When the caller has completed the message the caller hangs up, thereby terminating the call.

In an alternative preferred embodiment, an informing, alerting or notification feature is provided. With this feature, the server 92 waits a preselected period of time and initiates a call to the called party using the stored calling party or CLI information to inform the party that a multimedia message has been received and is stored in the memory 100 associated with the server 92. If the alerting does not go through, a feature may be straightforwardly implemented so that the server 92 will again wait a preselected period of time and try alerting the party again, repeating the process until a proper alert is made. In a still further embodiment, the alerting may continue until the party "acknowledges" the alert by, for example, answering an alert phone call or connecting to the server. Alternatively, the server 92 may be configured to alert the party by calling the party's voice messaging service, for example AT&T's AUDIX, and leave a voice message indicating that a multimedia message has been recorded.

In alternative embodiments, the alerting feature may further include setting a message indicator 86 on a telephone 80 as shown and described in connection with FIG. 1 or on the cable or satellite processing equipment 158 of FIG. 1. In still other embodiments, the alerting feature may be accomplished by, for example, e-mail, voice mail, setting an indicator in the LAN server which will bring up an alerting icon or message on a connected CRT screen. In still further embodiments, message alerting may be accomplished using a transportable wireless device 136, for example, a pager, a cellular telephone or a computer with a wireless multimedia capable modem. It will be recognized that the wireless device may receive a portion of the message (i.e. the audio portion) or, in the case of a wireless multimedia capable device such as a multimedia capable wireless modem connected to a laptop computer or a multimedia capable portable telephone, the unified multimedia message.

It will be recognized in connection with FIG. 3 that if the called party was not in, the processing would be the same except the switch would receive a CFNR signal when the call had gone unanswered after a predetermined number of rings.

While it is preferred that the server use CLI received from the telecommunication network, if the telecommunication network is incapable of providing CLI, a convenient alternative implementation can be achieved by establishing at least two dedicated telephone numbers for the server with the first being the directly dialed server telephone number a party seeking purely to retrieve messages would call and the second being a server telephone number that a caller is forwarded to solely for the purpose of leaving a message.

Advantageously, if the telecommunication network switch does not comply with CCITT recommendations I.252.2 and I.252.3 or a have a similar functionality, a still further convenient alternative embodiment uses the communication application running in the caller's multimedia communication device or station to hang up after a busy signal or a preselected number of rings and then automatically dial the network based server.

Once connected to the server, the call would then proceed as described herein.

Figure 4:
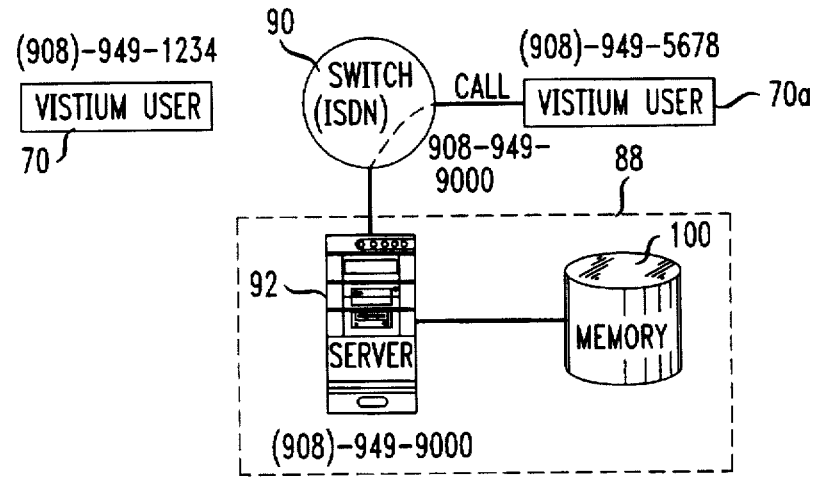
FIG. 4 shows the process of retrieving the multimedia message left in connection with FIG. 3.

Referring now to FIG. 4, which is the same as FIG. 2 except a message and greeting are stored in the memory 100. After a period of time, the party who was the intended recipient of the message discussed in connection with FIG. 3 returns and is alerted that a message is pending. Alternatively, the party could be at a remote location and receive an alert via a wireless device 136 or the party could be at a remote location, for example, at a hotel with an accessible multimedia station 126 and decides to "call in" for any messages since it was not possible for the party to receive a message alert. The party connects to the server as in FIG. 2 to retrieve the pending message. After supplying the appropriate information the party selects the "play messages" option. The party will be furnished with, in the preferred embodiment, a list of all multimedia messages available for playback, with the most recent call listed first, and information which identifies the caller by, for example, their telephone number which was obtained from the CLI or their name. The party then has the option to select the particular message and have it played back. Upon selecting a message, the server 92 furnishes the message to the party. When the message has completed playing, the party may be returned to the selection menu or have the call terminated. If, at any time, the party hangs up or the call is disconnected, the message is retained by the server.

In a further embodiment, where the party is at a remote location and wishes to check messages but does not have access to a multimedia station, the caller may still connect to the server with a device which is only capable of receiving an audio portion of the message. The telecommunication network will determine that the call is "voice only" and discriminate between an audio portion and a video/data portion (which includes non-audio aspects of the message) and furnish only the audio portion of any message(s) not previously retrieved. The party will still have the option of deleting the message. If the message is not deleted, the entire stored message (i.e. the audio portion and video/data portion) will still remain stored thereby preserving the video and data aspects until the party can call in from a multimedia station.

In still further embodiments, the server 92 is capable of converting the stored message from one format to another so that, for example, differences in formats or protocols between the calling and receiving end can be accommodated (e.g. video formats, audio formats, data formats and communication formats or protocols).

While the invention has been described in connection with a pair of multimedia stations, where the receiving location is, for example, cable 152, satellite 148 or a modem 156, where necessary, the message will be accessed using the additional processing equipment 158 discussed above in connection with FIG. 1.

Figure 5A:
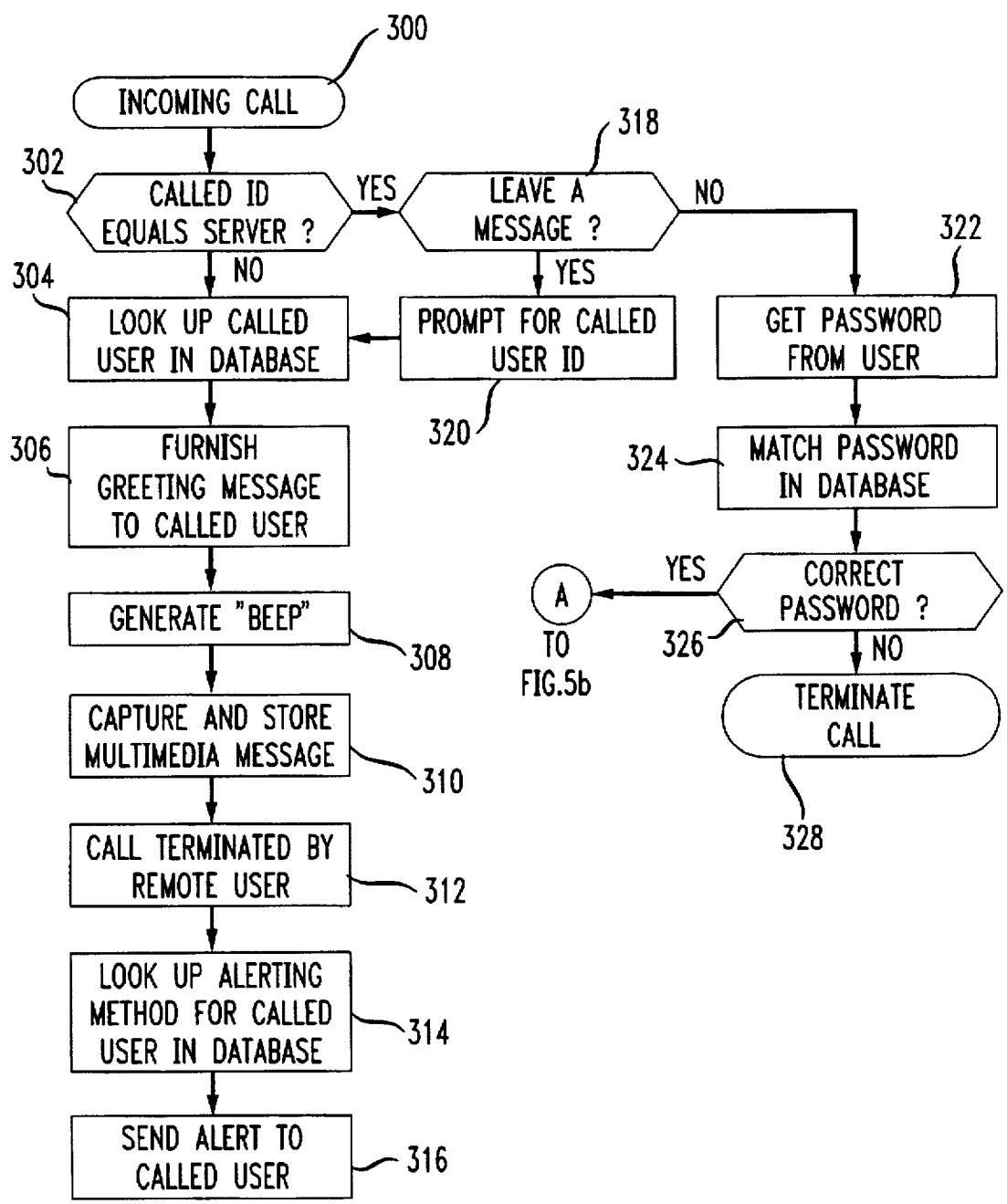
FIGS. 5a and 5b are a flow diagram illustrating the telecommunication network based server call flow in accordance with the teachings of the invention.
Figure 5B:
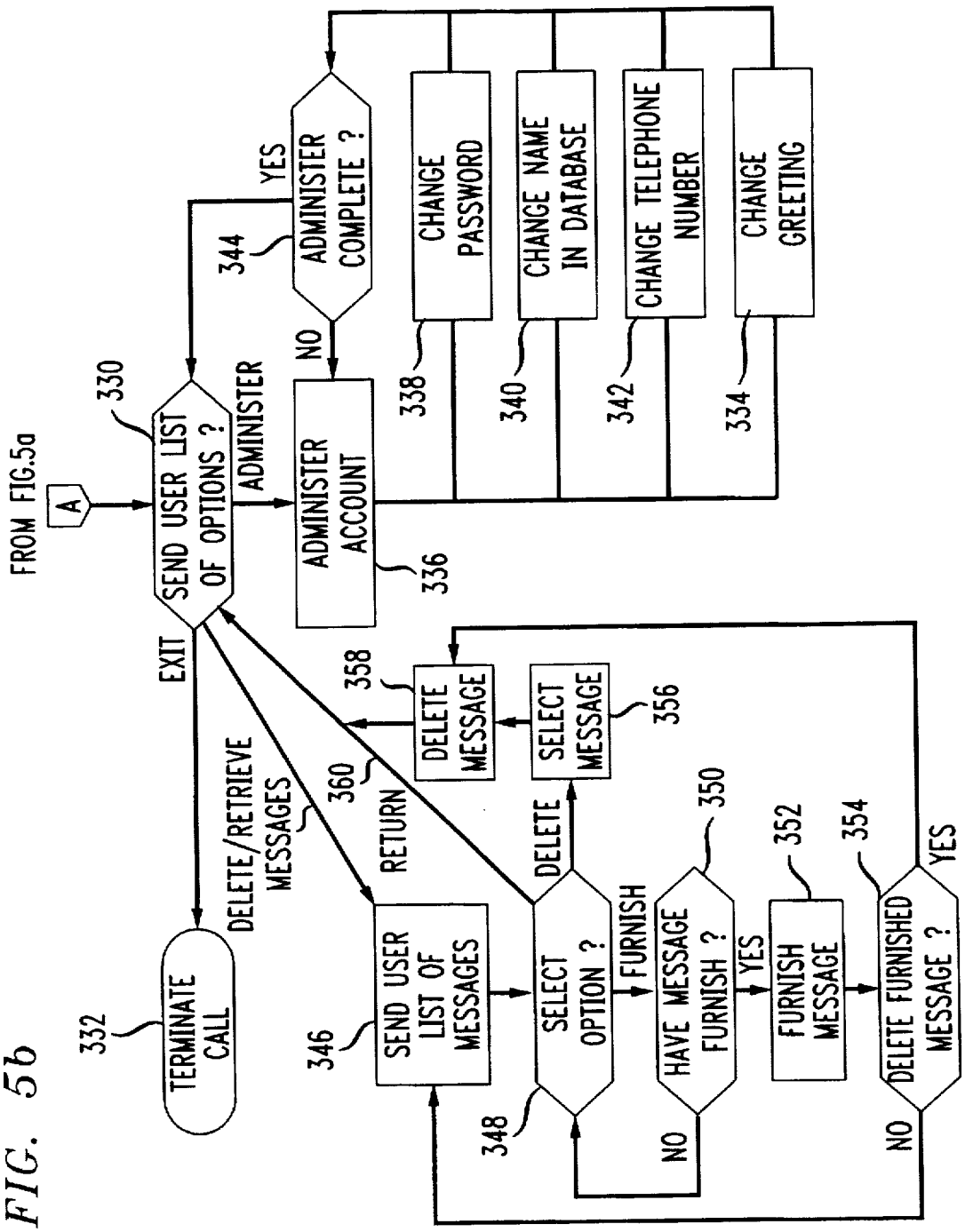

FIGS. 5a and 5b are a flow diagram illustrating the telecommunication network based server call flow for a preferred embodiment of the invention. The server 92 receives the incoming call from the switch 90 (Step 300). The server 92 then checks the ANI for the called number identification to determine if the called number identification was or was not the identification of the server (Step 302). If the called number identification does not correspond to the number identification for the server 92, the call was transferred as a result of a call forward. The server 92 therefore queries a database which contains a list of caller identification numbers for which the server will store multimedia messages and will identify the associated greeting message to be furnished to the caller (Step 304). As discussed above, the greeting message can be one previously recorded by the party associated with the called number or, where no prerecorded multimedia message has been recorded by the party, a standard greeting. Upon identifying the greeting message, the server 92 furnishes the greeting message to the caller (Step 306). At the conclusion of the message, the server will signal the caller to begin leaving a message, for example, with a "Beep" (Step 308). The server will proceed to capture and store the caller's multimedia message (Step 310) in the memory 100. Upon termination of the call by the user (Step 312), the server queries a database for an alerting method associated with the called number identifier (Step 312). The server 314 then initiates alerting the party according to the particular method identified (Step 316).

If the called number identification corresponds to the number identification for the server 92, the call was a direct call. To handle the situation where the caller has called the server to directly leave a message for another party without calling the party, the server 92 provides a message to the caller to identify if the caller wants to leave a message (Step 318). If the response is yes, the caller is prompted for the calling and called parties' telephone numbers (Step 320). The server 92 uses the provided called party number in the called number identifier and proceeds as if the call was switched to the server 92 (Steps 304 to 316). If the caller's response is no, the server 92 prompts the caller for a password (Step 322). The server 92 then queries a database (Step 324) to determine if the password provided by the caller is correct (Step 326) and if it is not, the server terminates the call (Step 328). If the password is correct, the caller is provided with a plurality of options (Step 330). Exemplary options include Exit, Administer, Change Greeting and Delete/Retrieve. "Exit" terminates the call (Step 332). "Administer" (Step 336) allows the caller to perform administrative functions related to the caller's account such as changing their password (Step 338), changing their name in the database (Step 340), for example, from "Robert" to "Bob" or from "Ms. Custis" to "Mrs. Washington", or changing their telephone number (Step 342), for example, for alerting purposes after moving to a new address or change the greeting message (Step 334) furnished to callers. When the party has finished with the administrative functions (Step 344) the party can return to the other options (Step 330). "Delete/Retrieve" prompts the server to furnish messages stored for the caller's identification. When "Retrieve" is selected the caller is provided with a list of stored messages (Step 346) and an option to delete/retrieve/ return (Step 348). If the caller selects a message and the delete option (Step 356), the selected message will be deleted by the server 92 from the memory 100 (Step 358). If the caller selects a message and the retrieve option (Step 350), the selected stored message is then furnished to the caller (Step 352). Upon completion of the server's furnishing the message, the caller is then given the option of deleting the message (Step 354). If the caller selects "YES", the message is deleted (Step 358) and the caller is returned to the message list (Step 346). If the caller selects "NO", the message is saved and the caller is again returned to the message list (Step 346). Once the caller has finished retrieving and/or deleting the messages, the caller selects to return to the main option list (Step 360).

It will be recognized that while the invention has been described with reference to a network based server, the same functionality may be achieved using a distributed environment within the network (e.g. a plurality of network based servers) or which also incorporates non-network based servers in conjunction with one or more network based servers.

Figure 6:
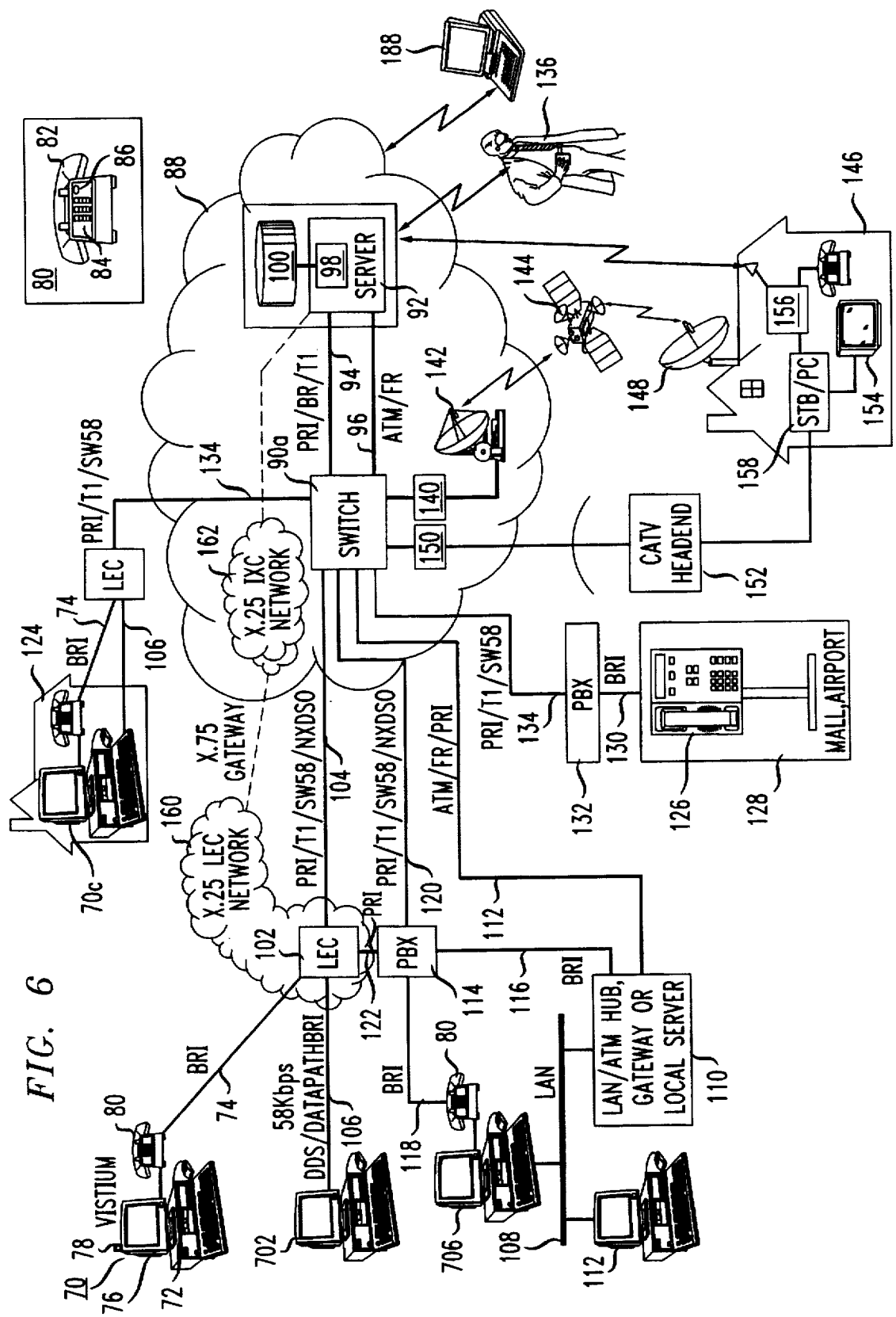
FIG. 6 shows a simplified telecommunication network in accord with an embodiment of the present invention which utilizes a non-CCITT compliant switch.

Referring now to FIG. 6, which illustrates the network of FIG. 1, except the switch 90 of FIG. 1 is replaced by a non-CCITT compliant switch 90a. In this embodiment, messaging is accomplished in a manner which eliminates the need for implementation of the CCITT recommendations described above (i.e. Call Forwarding Busy, Recommendation I.252.2 (1992) and Call Forwarding No Reply, Recommendation I.252.3 (1992)). In this embodiment, the method of establishing a connection with the server differs from the above as follows.

In this embodiment, two applications are used in the carter's station. The first, is the application used to initiate, establish and conduct the multimedia communication according to, for example, the H.320 or Indeo protocols, and the second is an application which runs in the background as a "watchdog" which monitors for a "time-out" indication. As will be described in greater detail below, a time-out occurs when a specified period of time elapses before a connection is made or a busy signal is detected.

Since the switch is unable to detect or respond to a busy or no answer signal, the communication and watchdog applications in the caller's multimedia station are configured to create a similar functionality. The interaction of the two applications with each other and the network elements of FIG. 6 will now be described by way of representative example in a preferred embodiment.

First, the communication and watchdog applications are set running in the caller's multimedia station 70a. A call is initiated from the multimedia station 70a as described above. The setup of the call includes preparing an X.25 packet message and establishing a connection for passing the X.25 packet message, for example, as described in commonly assigned U.S. Pat. No. Re 31,319, U.S. Pat. No. 4,529,840 and U.S. Pat. No. 4,531,024, all incorporated in their entirety by reference, and Roy D. Rosner, Packet Switching Tomorrows Communications Today, Lifetime Learning Publications at pp. 130–135 (1982) also incorporated herein by reference. The communication application is configured so that upon initiating a communication, the watchdog application, which is running in the background, begins waiting for an event, for example, the counting of a preselected number of ringing cycles or the passage of a specific period of time. This event is used to indicate that the called party is unavailable, i.e. the party's line is busy or did not answer. If the event does not occur before the call is answered, the answering of the call suspends the operation of the watchdog application. If however, the event occurs before the call is answered, i.e., when the preselected number of ringing cycles is reached or the specific period of time elapses, the called party is considered unavailable and the watchdog application generates a "time-out" indication to the communication application, for example, by way of an interrupt, and then goes idle. In one embodiment, upon generation of the time-out, the communication application displays a message for the caller which indicates that the call has gone unanswered and allows the caller the option of terminating the call without invoking the messaging feature. If the caller elects to terminate the call, the application does so. If the caller selects the messaging option, the following occurs. In still another embodiment, upon generation of the time-out, the following automatically occurs without providing options to the caller.

Upon receipt of the time-out indication from the watchdog application, the communication application prepares X.25 packet messages, which contains, inter alia, information on who was called. As preferred, the call-request frame and packet 96 bit "user data" field contains a security password and the subsequent data packet 1024 bit "user data" field contains the telephone number of the called party.

For simplicity, the call-request frame and packet and subsequent data packets are collectively and interchangeably referred to herein as an X.25 packet message.

In one embodiment, the identification of the network based multimedia server is included as part of the communication application. In other embodiments, the identification may have to be separately obtained and stored for use by the communication application, for example, from a list provided by: an IXC, the application provider, the called party, or the messaging service provider.

The application sends the X.25 packet message, through the X.25 LEC Network 160 and its X.75 packet gateway to the X.25 network 162 of the indicated multimedia server 92. Based upon the information contained in the X.25 message, the processor 98 in the indicated multimedia server 92 queries the database 100 for the proper messaging server identification or messaging address of the called party. As preferred, the messaging address indicates the telephone number of that party's multimedia messaging server although, in other embodiments it may identify a default messaging server. The processor 98 sends the server identification information (i.e. the messaging address) back over the X.25 connection to the application, using an X.25 packet message, which includes the telephone number of a messaging server and may additionally include data items such as security or password information, or data which indicates to the multimedia messaging server that the caller wishes to leave a message in order to bypass any options or menues which would otherwise be available to a caller directly calling the server.

A new call is set up by the communication application, which populates the calling field with the messaging address (i.e. the server calling number), and a multimedia call is initiated directly to the messaging server as described above. When the call reaches the server, the communication application uses the information supplied by the server 92 to automatically indicate to the messaging server that the party wishes to leave a message. The application then identifies the calling party and called party to the messaging server and is furnished with the called party's greeting as described above. Once the caller has finished leaving a message, the call is terminated. The process of notifying the called party then proceeds as described herein.

It will be further recognized that a plurality of the above servers may be provided as part of a hierarchical arrangement, for example, as described in commonly assigned U.S. patent application Ser. No. 08/525,440 fried Sep. 7, 1995 incorporated by reference.

Thus, while there have been shown and described and pointed out fundamental novel features of the invention as applied to preferred embodiments thereof, it will be understood that various omissions and substitutions and changes in the form and details of the disclosed system, and in its operation, may be made by those skilled in the art without departing from the spirit of the invention. It is the intention, therefore, to be limited only as indicated by the scope of the claims appended hereto.

We claim:

1. In a telecommunication network including an identified multimedia server, a method of messaging multimedia calls from a caller, using a multimedia device running a first application and a second application, the method comprising the steps of:

initiating a first multimedia call to the called party using the first application;

determining that said first multimedia call is an unanswered call using the second application;

signalling the first application using the second application so as to indicate that said first multimedia call is said unanswered call;

responsive to said signal, sending an X.25 packet message from the multimedia device to the identified network based multimedia server;

receiving from the network based multimedia server, at the multimedia device, a messaging address identifying a multimedia messaging server;

initiating a second multimedia call from said multimedia device to said identified multimedia messaging server using the first application and said messaging address;

connecting to said multimedia messaging server identified by said messaging address; and recording a multimedia message on said network based multimedia messaging server.

2. The method of claim 1 wherein following said connecting step the method includes the step of furnishing the caller with a multimedia greeting.

3. The method of claim 1 wherein, prior to said signalling step, the method includes the step of counting ringing cycles until a preselected number of ringing cycles has occurred.

4. The method of claim 1 wherein, prior to said signalling step, the method includes the step of waiting until a preselected period of time has elapsed.

5. The method of claim 1 wherein, following said signalling step, the method includes the step of displaying a message for the caller indicating that the call was an unanswered call.

6. The method of claim 5 wherein the method further includes the step of providing the caller with the option of invoking a messaging feature.

7. A method of multimedia messaging comprising:

initiating a messaging application and a watchdog application in a multimedia capable station having a display device;

initiating a first multimedia call to a party using said multimedia capable station;

establishing, as part of said initiation, a connection capable of passing X.25 packet messages between said multimedia capable station and a device in a telecommunication network;

signalling said messaging application, using said watchdog application, to indicate that said party is unavailable;

generating a first X.25 packet message in said multimedia capable station and sending said X.25 packet message to said device in said telecommunication network;

receiving a second X.25 packet message from said device server including information identifying a multimedia messaging server capable of recording multimedia messages and furnishing previously stored multimedia messages to multimedia capable stations;

initiating a second multimedia call from said multimedia capable station to said identified multimedia messaging server; and recording a multimedia message for said party on said identified multimedia messaging server.

8. The method of claim 7, further including the step of displaying a message on said display device indicating that said first multimedia call was unanswered.

9. The method of claim 7, further including the step of identifying from said received X.25 packet message data indicating a connection address for said multimedia messaging server.

10. The method of claim 7, further including the step of displaying, on said display device, a previously stored multimedia message furnished by said multimedia messaging server.

* * * * *